United States Patent [19]

Taylor

[11] Patent Number: 4,787,409
[45] Date of Patent: Nov. 29, 1988

[54] RUPTURE PIN VALVE SYSTEM

[76] Inventor: Julian S. Taylor, 8300 SW. 8, Oklahoma City, Okla. 73128

[21] Appl. No.: 131,592

[22] Filed: Dec. 11, 1987

Related U.S. Application Data

[63] Continuation-in-part of Ser. No. 931,305, Nov. 17, 1986, Pat. No. 4,724,857.

[51] Int. Cl.⁴ ............................................. F16K 17/40
[52] U.S. Cl. ......................................... 137/67; 137/70; 220/366; 251/118
[58] Field of Search ............... 137/67, 70, 522, 516.11; 220/366; 251/121, 127, 118, 216

[56] References Cited

U.S. PATENT DOCUMENTS

| | | | |
|---|---|---|---|
| 1,799,025 | 3/1931 | Schrader | 251/118 X |
| 2,141,847 | 12/1938 | Tennant | 137/70 |
| 2,203,367 | 6/1940 | Schorer | 137/70 |
| 4,146,207 | 3/1979 | Rofe | 251/120 |
| 4,579,823 | 4/1986 | Ryder | 220/366 X |
| 4,724,857 | 2/1988 | Taylor | 137/67 |

Primary Examiner—Martin P. Schwadron
Assistant Examiner—Stephen M. Hepperle
Attorney, Agent, or Firm—Robert K. Rhea

[57] ABSTRACT

An axially bored valve body having inlet and exhaust ports is provided with a valve movable toward and away from a sealed position in the inlet port at its pressure connected end. A cap closes the end of the body opposite its inlet port. An axially collapsible member is axially interposed between the downstream end of the valve stem and the cap to normally maintain the fluid passageway between the ports closed. Excessive fluid pressure against the valve at the inlet port collapses the collapsible member and unseats the valve to open the fluid passageway.

9 Claims, 2 Drawing Sheets

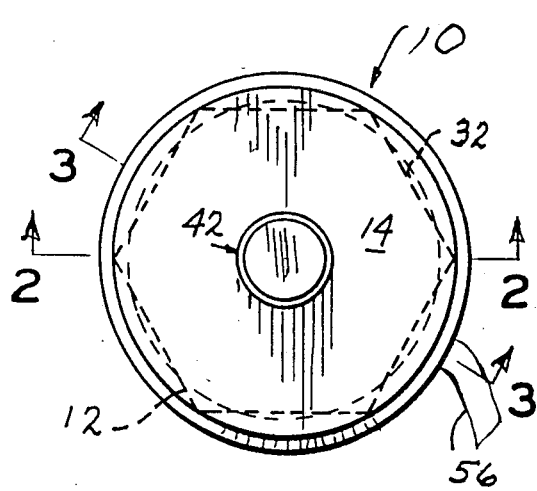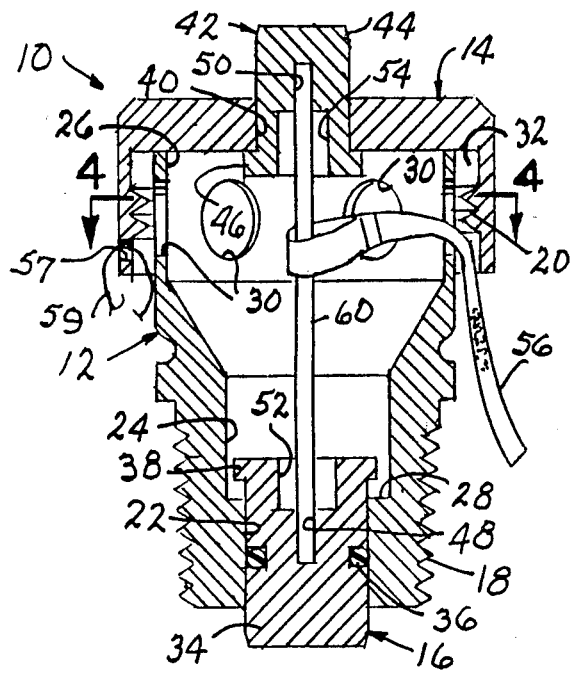

RUPTURE PIN VALVE SYSTEM

CROSS REFERENCE TO RELATED APPLICATION

This application is a continuation-in-part of an application filed by me in the U.S. Patent and Trademark Office on Nov. 17, 1986, Ser. No. 931,305 for PRESSURE RELIEF VALVE, U.S. Pat. No. 4,724,857.

BACKGROUND OF THE INVENTION

1. Field of the Invention.

The present invention relates to fluid pressure relief valves.

Relief valves are conventionally used in fluid pressure systems for the purpose of protecting the fluid pressure generating equipment, such as a cylinder, cylinder heads, bolts, pump valves, packing or cups, so that, in the event of malfunction or closing an external valve in error or excessive pressure as caused by a clogged drilling bit, the relief valve is biased to an open fluid discharge position enabling the operators to correct the malfunction without damage to the equipment. This invention provides such a relief valve.

2. Description of the Prior Art.

Fluid pressure relief valves presently in use and as disclosed by prior patents generally relate to valve structure which includes a valve stem or mandrel moved longitudinally in response to predetermined fluid pressure which shears a pin or ruptures a frangible disk, or the like. The pressure setting in which these valves open to release such pressure is predetermined by the pressure necessary to shear the shear pin or rupture the frangible disk. The pressure at which such a valve opens is thus predetermined by the known rating or shearing force required to shear a pin or rupture a frangible disk of predetermined thickness.

Shear type valves are dangerous in that they can be rendered inoperative by a workman, tired of resetting the valve, putting more than one shear pin or nail through the shear bar on one type safety relief valve or using extra strong metal, such as an Allen wrench through the shear stem in another type shear relief valve. Rupture disks have the disadvantage of being difficult to service in the field after rupture.

Rather than a frangible disk or shear pin this invention provides a relief valve in which fluid pressure axially collapses a single strand wire-like pin, shaft or tube. Nothing in the line has to be disturbed during resetting as the piston seal can be reset external to the valve cavity.

So far as I know prior patents do not disclose a relief valve which axially collapses a pressure responsive member in response to a predetermined pressure.

SUMMARY OF THE INVENTION

A polygonal periphery valve body is provided with an axial bore forming an inlet port at one end and a counterbore in its other end portion closed by an end cap with lateral wall bores intersecting the counterbore to form fluid outlet ports. The wall of the inlet port forms a valve seat slidably receiving a valve normally sealed with the seat. An elongated pin or rod is axially interposed between the end cap and the valve and nested at its respective end portions by sockets therein for normally maintaining the valve sealed with its seat. Excessive fluid pressure above a predetermined value at the inlet port forces the valve means toward the cap collapsing the pin by laterally bending it to open the valve and release fluid.

The principal object is to provide a pressure relief valve which axially collapses a pin at a predetermined pressure and in which the collapsed pin is contained by the valve until manually replaced and the valve reset.

BRIEF DESCRIPTION OF THE DRAWINGS

FIG. 1 is a top view of one embodiment of a collapsible pin relief valve;

FIGS. 2 and 3 are vertical cross sectional views taken substantially along the lines 2—2 and 3—3, respectively, of FIG. 1 and illustrating, by dotted lines (FIG. 2), the pressure opened position of the valve;

FIG. 7 is a vertical cross sectional view of a further embodiment of the relief valve body; and, FIG. 8 is a vertical cross sectional view of an additional version of the relief valve.

DESCRIPTION OF THE PREFERRED EMBODIMENTS

Figure 6:
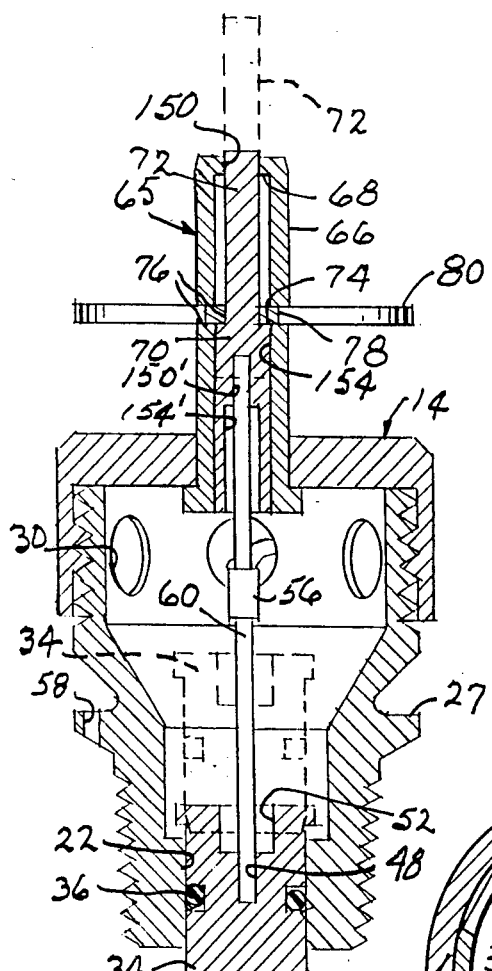
FIG. 6 is a vertical cross sectional view taken substantially along the line 6—6 of FIG. 5.

Like characters of reference designate like parts in those figures of the drawings in which they occur.

In the drawings:

Referring first to FIGS. 1 to 4, the reference numeral 10 indicates the valve, as a whole, which is elongated tubular in general configuration comprising a body 12 having a cap 14 at one end and axially supporting a valve pin means 16. The body 12 is preferably formed from hexagonal bar stock for the reasons believed presently apparent.

Obviously, the body may be cast to define a desired external configuration which preferably includes at least one chord surface subtending an arc of its periphery. One end of the body is diametrically reduced and externally threaded, as at 18, for connection with a vessel containing fluid under greater than atmospheric pressure, neither of which are shown. The opposite end of the body is similarly externally threaded, as at 10, on a diameter slightly greater than the "across the flats" dimension of the hexagonal periphery so that threads are formed on the "points" of the hexagonal shape. Intermediate it ends, the body is characterized by an outstanding hexagonal shaped flange 27 for the purpose presently explained.

The body is axially bored to form an inlet port 22 in its diametrically reduced end portion and is dual counterbored from its opposite end, as at 24 and 26, defining an annular shoulder 28 intermediate the length of its diametrically reduced end portion. The threaded end portion 20 of the body is transversely apertured by boring across its flats to define a plurality of lateral apertures or bores 30.

The cap 14 threadedly engages the threads 20 and defines a plurality of voids 32 between the inner wall surface of the cap 14 and the flats of the hexagonal shape which communicate with the transverse apertures 30 and provide fluid exhaust passageways between the counterbore 26 and the atmosphere.

The valve pin means 16 comprise a plug-like valve 34 having an annular seal, such as an O-ring 36, intermediate its ends for a seating seal with the wall forming the inlet port 22 and having an annular outstanding flange 38 in the counterbore 24 contained end for engaging the body shoulder 28 preventing axial outward separating movement of the valve relative to the body.

The cap 14 is axially bored, as at 40, for receiving a pin stop means 42. The pin stop means comprises a plug-like member 44 substantially identical in configuration with respect to the valve 34 with the exception of the O-ring seal including an annular shoulder 46 at its inward end abutting the inner end surface of the cap 14. Both the valve 34 and the plug 44 are coaxially drilled and counterbored from their respective inwardly disposed end to form pin sockets 48 and 50 and pin surrounding counterbores 52 and 54, respectively.

An elongated pressure collapsible member, such as a rod or pin 60, is coaxially received at its respective end portions by the sockets 48 and 50. The pin 60, which may be tubular, is preferably formed from metallic material in which its strength or resistance to collapsing in response to fluid pressure against the valve 34, such as illustrated by dotted lines (FIG. 2), varies directly as the fourth power of its diameter and inversely as the square of its length.

An important feature of the valve 10 is a tamper proof pressure rating indicator in the form of an elongated flexible material strip 56. The strip 56 is secured, at one end portion, around the pin 60 and projects, at its other end portion, outwardly of the body 12 through one of the apertures 30. Pressure rating data, not shown, is printed on the exposed end portion of the strip 56.

The wall of the cap 14 is apertured, as at 57 (FIG. 3), and the hexagonal flange 27 is cooperatively apertured on one of its points, as at 58 (FIG. 2), for receiving a seal wire or strand 59 normally precluding unauthorized removal of the cap 14.

Figure 5:
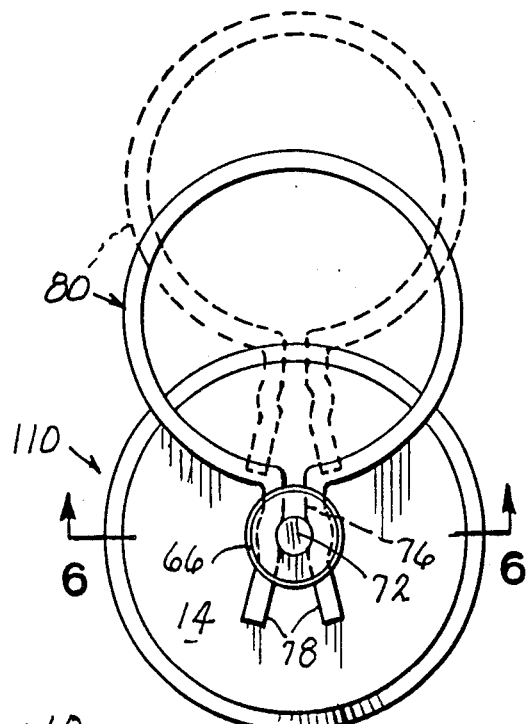
FIG. 5 is a top view of another embodiment of the relief valve illustrating, by dotted lines, the manually released position of a collapsible pin locking clip.
Figure 4:
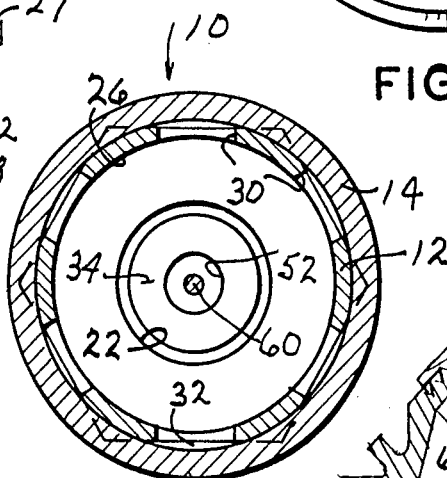
FIG. 4 is a horizontal sectional view taken substantially along the line 4—4 of FIG. 3.

Referring also to FIGS. 5 and 6, the numeral 110 indicates another embodiment of the relief valve in which the pin stop means 65 is manually released without removing the cap 114. With the except of the pin stop means 65 the components of this valve are identical with and bear the same reference numerals as the embodiment 10.

The plug portion 66 of the pin stop means 65 is elongated a dimension at least twice the length of the plug 44 (FIGS. 2 and 3) and its counterbore 154 is substantially coextensive but terminates adjacent the plug outer end limit to define an annular inwardly directed shoulder 68 surrounding its axial bore 150. The plug counterbore 154 slidably receives a piston 70 having a diametrically reduced outwardly directed end portion 72 slidable in the axial bore 150 and defining an annular shoulder 74 intermediate its ends. The wall of the plug 66 is provided with opposing slots or apertures 76 which removably receive opposing end prongs 78 of a split ring type spring clip 80. The inwardly disposed end of the piston 70 is similarly bored and counterbored, as at 150' and 154', cooperatively aligned with the socket 48 and bore 52 in the valve 34 for similarly receiving the pin 60.

When it is desired to release pressure contained by the valve 110, the spring clip 80 is manually moved in al sliding action to remove its prongs 78 from the is permits fluid pressure against the valve 34 to axially move the valve, pin 60 and piston 70 in an axial direction, as illustrated by dotted lines (FIG. 6), which opens the inlet port 22 and discharges fluid pressure through the lateral bores 30, the piston movement being stopped by the shoulder 74 engaging the plug shoulder 68.

FIG. 7 illustrates a further embodiment of the relief valve, indicated by the numeral 210, in which the valve body 86 is axially elongated at its inlet port end and provided with a lateral or discharge port 88 intermediate the ends of the bore forming the inlet port 22. The ports 22 and 88 are normally closed by an elongated valve member 90 similar to the valve 34 but having additional O-ring seals 92 and 94 so that when the valve 90 is released by the collapse of the pin 60, the O-rings 92 and 94 isolate the valve cap end of the valve from fluid being discharged from the inlet port through the exhaust port 88.

Figure 8:
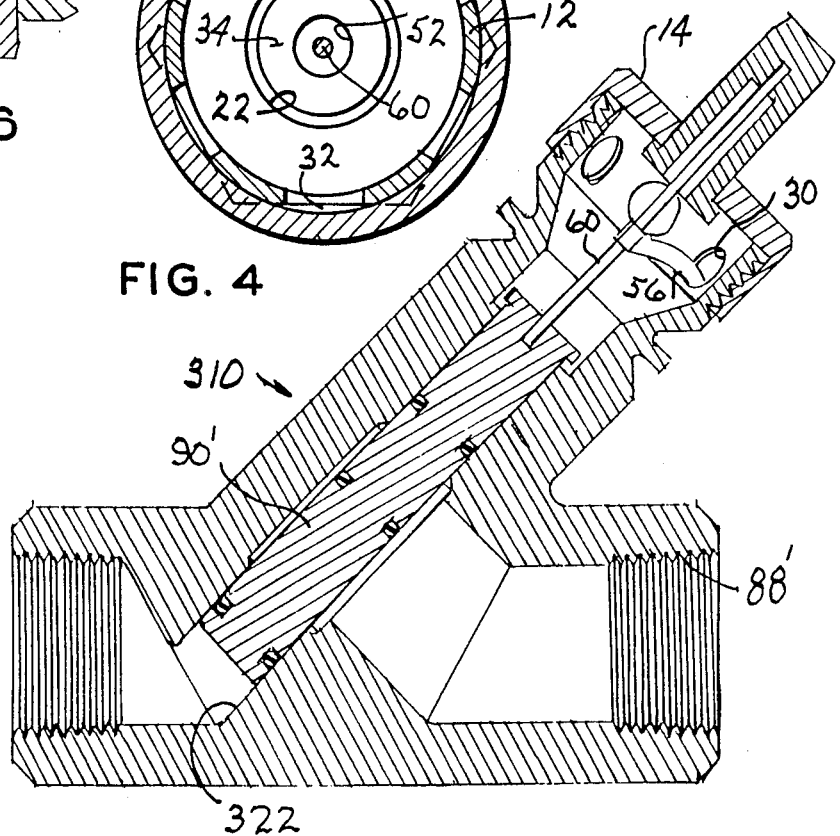

The numeral 310 (FIG. 8) indicates a further embodiment of the relief valve similarly having an elongated valve 90' substantially identical with the valve 90 of FIG. 7 but in which the body 312 includes a lateral or discharge port 88' substantially forming an inline continuation of the inlet port 322.

Obviously the invention is susceptible to changes or alterations without defeating its practicability. Therefore, I do not wish to be confined to the preferred embodiment shown in the drawings and described herein.

I claim:

1. A pressure relief valve, comprising;
   a valve body having an axial bore forming an inlet port at one end and a counterbored opposite end portion and having at least one transversely apertured chord surface subtending
   an arc of its periphery at its counterbored end portion; valve means slidable in the axial bore and normally closing the inlet port;
   valve cap means secured to the body and axially closing the counterbore;
   pin stop means axially projecting through the cap means in a direction opposite the inlet port; and,
   collapsible means including an elongated rigid member axially interposed between said pin stop means and said valve means for normally maintaining said inlet port closed.

2. The relief valve according to claim 1 in which the collapsible means comprises:
   an elongated pin.

3. The relief valve according to claim 2 and further including:
   an elongated strip of flexible material having valve pressure rating data thereon secured by one end portion to said pin and projecting at its other end portion laterally of said cap means through a wall aperture.

4. The relief valve according to claim 2 in which the valve means and pin stop means are axially bored centrally to form confronting axially aligned sockets for closely nesting respective end portions of said pin.

5. The relief valve according to claim 2 in which the pin stop means includes:
   a tubular member having a closed end opposite the inlet port and having an outstanding annular flange abutting said valve cap means end wall.

6. The relief valve according to claim 4 in which the pin stop means includes:
   a tubular wall member having an outstanding annular flange abutting the inner surface of said valve cap means end wall and having an annular inwardly directed flange at its opposite end;
   a piston slidable in said tubular member; and, means projecting through the wall of said tubular member for normally preventing longitudinal movement of said piston relative to said tubular member.

7. The relief valve according to claim 6 in which the wall of said tubular member is slotted intermediate its ends and further including:

an annular shoulder on said piston adjacent a slot in the wall of said tubular member.

8. The relief valve according to claim 7 in which said through the wall means includes:

a spring clip contacting said annular shoulder.

9. The relief valve according to claim 4 in which said valve body is provided with a lateral bore communicating with the inlet port to form a downstream fluid passageway, said valve means normally bridging the position of the lateral bore and remaining sealed with the downstream end portion of the inlet bore when biased to an inlet port open position.

* * * * *